US008458619B2

(12) United States Patent
Hamzy et al.

(10) Patent No.: US 8,458,619 B2
(45) Date of Patent: Jun. 4, 2013

(54) METHOD, SYSTEM AND PROGRAM PRODUCT FOR SCREENSAVER BREAKTHROUGH OF PRIORITIZED MESSAGES

(75) Inventors: Mark Joseph Hamzy, Round Rock, TX (US); Dustin Kirkland, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2555 days.

(21) Appl. No.: 11/011,252

(22) Filed: Dec. 14, 2004

(65) Prior Publication Data
US 2006/0129947 A1 Jun. 15, 2006

(51) Int. Cl.
*G06F 3/048* (2006.01)
*G06F 3/00* (2006.01)

(52) U.S. Cl.
USPC ........... 715/867; 715/710; 715/714; 715/766; 715/767; 715/768; 715/805; 715/808; 715/809

(58) Field of Classification Search
USPC ................. 715/867, 710, 714, 766–768, 805, 715/808, 809
See application file for complete search history.

(56) References Cited

U.S. PATENT DOCUMENTS

| 6,288,715 | B1 * | 9/2001 | Bain et al. ................... 345/211 |
| 6,353,449 | B1 * | 3/2002 | Gregg et al. .................. 715/762 |
| 6,529,209 | B1 | 3/2003 | Dunn et al. |
| 7,243,130 | B2 * | 7/2007 | Horvitz et al. ................. 709/207 |
| 7,484,106 | B2 * | 1/2009 | Rhoten et al. ................. 713/193 |
| 2003/0154490 | A1 * | 8/2003 | Chang ........................... 725/105 |
| 2004/0032431 | A1 * | 2/2004 | Hymes et al. .................. 345/779 |
| 2004/0075701 | A1 * | 4/2004 | Ng .................................. 345/867 |
| 2004/0128093 | A1 * | 7/2004 | Cragun et al. ................... 702/79 |
| 2004/0221297 | A1 | 11/2004 | Greve |

FOREIGN PATENT DOCUMENTS

| JP | 6282391 A | 10/1994 |
| JP | 8016121 A | 1/1996 |
| JP | 9311837 A | 12/1997 |
| JP | 2003211799 A | 7/2003 |
| JP | 2003290196 A | 10/2003 |
| JP | 2001209615 A | 10/2010 |

OTHER PUBLICATIONS

Leise, LE, Hardware Monitor Security Feature, RA8870247, Aug. 1989, p. 284-285, Raleigh NC.

\* cited by examiner

*Primary Examiner* — Steven B Theriault
(74) *Attorney, Agent, or Firm* — Yudell Isidore Ng Russell PLLC

(57) ABSTRACT

Authorized priority alerts are permitted to "pop up" on top of a running screensaver in a computer display without suspending operation of the screensaver. A windows manager monitors for priority alerts from applications. If the screensaver is active in the display, the windows manager determines if the alert issuing application and alert type are permitted to breakthrough the screensaver. If so, an alert notification window identifying the content of the alert is generated and displayed in z-order on top of the screensaver, without interrupting the operation of the screensaver displayed underneath. Some notification windows implement security features by displaying only a portion of the content of the corresponding alert or completely obscuring the content of the alert and only notifying of the presence of the alert. An additional security feature requires the user to enter a password in the notification window before the content or type of alert is displayed.

21 Claims, 6 Drawing Sheets

TABLE OF ALL WINDOWS: 400
| STATE | LEVEL | NICKNAME | X-Y RANGE | PIXEL... | DISK ADDRESS |
|---|---|---|---|---|---|
| DISPLAYED | - | BACKGROUND | 1/1:100/100 | X'FE',X'FE',X | 02AA00 |
| ICONIFIED | - | EMAIL CLIENT | 4/4:20/20 | X'1F',X'1F',X | 02BB00 |
| DISPLAYED | 4 | WORD PROCESSOR | 50/40:80/79 | X'14',X'72',X' | 1F0C00 |
| DISPLAYED | 3 | GAME | 22/13:60/45 | X'56',X'55',X | 1C4800 |
| DISPLAYED | 2 | WEB BROWSER | 40/15:70/35 | X'00',X'00',X | 1BF000 |
| DISPLAYED | 1 | FAX VIEWER | 20/10:60/20 | X'40',X'40',X | 04DC00 |
*Figure 4*
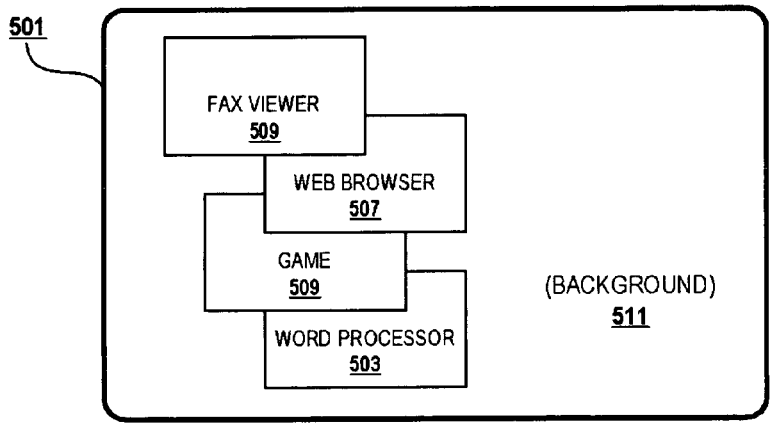
*Figure 5*
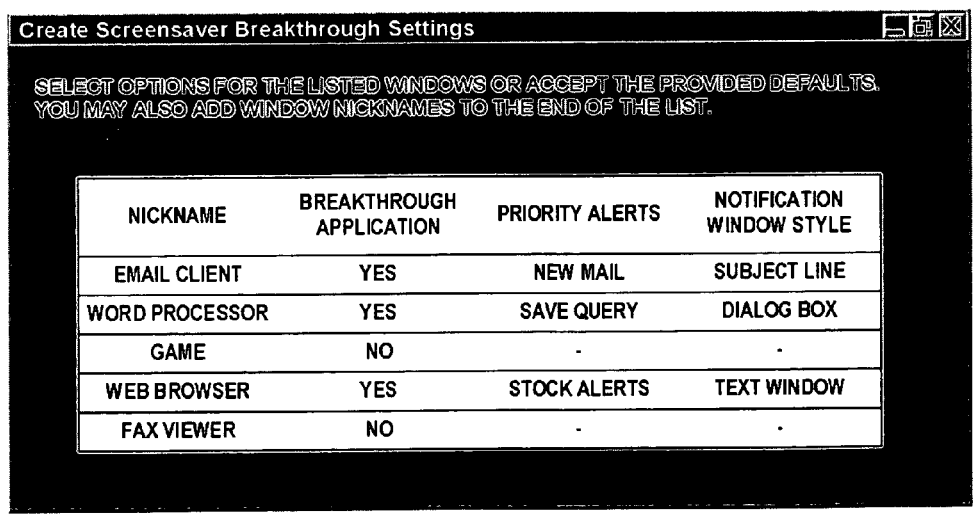
*Figure 6*

| NICKNAME 702 | BREAKTHROUGH APPLICATION 704 | PRIORITY ALERTS 706 | NOTIFICATION WINDOW STYLE 708 |
|---|---|---|---|
| EMAIL CLIENT | YES | NEW MAIL | SUBJECT LINE |
| WORD PROCESSOR | YES | SAVE QUERY | SECURE DIALOG BOX |
| GAME | NO | - | - |
| WEB BROWSER | YES | STOCK ALERTS | TEXT WINDOW |
| FAX VIEWER | NO | - | - |

METHOD, SYSTEM AND PROGRAM PRODUCT FOR SCREENSAVER BREAKTHROUGH OF PRIORITIZED MESSAGES

BACKGROUND OF THE INVENTION

1. Field of the Invention

The present invention relates generally to information processing systems, and more particularly to a methodology and system for providing computer notification of prioritized messages.

2. Description of the Related Art

Computer desktop environments of all major operating systems support multi-threaded processing and multiple window displays. Separate running computer processes or applications are represented by graphical interfaces in separate desktop windows. Many users try to maximize their usable display space by using large monitors or possibly using multiple monitors to display multiple overlapping windows on the display.

A screensaver for a computer work station provides a computer user with the means of manually or automatically obscuring the display when the computer user is either absent or inactive at the work station for some period of time. In operation, the screensaver blanks the display or presents an attractive pattern or image, which is usually repetitively displayed until the user engages the computer. Although screensaver functions are successful in obscuring the entire display, there are certain types of information the user would like to continue to observe or monitor even while the screensaver is in operation. In particular, there are certain prioritized messages and notifications that would be preferable to receive, but are otherwise hidden by the screensaver. For example, it would be desirable for the user to see, either briefly or permanently, instant message windows, new email subject lines, severe weather alerts, stock ticker information or alerts, etc. Unfortunately, with screensaver functionality currently provided in modern computer systems, prioritized messages generated by executing processes communicating new and possibly time-critical information are hidden from view by the screensaver and cannot be observed by the user.

SUMMARY OF THE INVENTION

In accordance with the present invention, improved methods, systems and articles of manufacture for providing alert notification in a data processing system are disclosed. In one embodiment of the present invention, a windows manager monitors for receipt of an alert from a process requesting display of alert information in the display device of the data processing system while a screensaver is being displayed in a display device. The windows manager displays a notification window indicating the alert in a z-order above the display of the screensaver in the display device, wherein the screensaver continues operating to obscure at least a portion of the display device during display of the notification window. In one embodiment, the windows manager determines that the process and alert are authorized to breakthrough the screensaver before displaying the notification window.

All objects, features, and advantages of the present invention will become apparent in the following detailed written description.

BRIEF DESCRIPTION OF THE DRAWINGS

This invention is described in a preferred embodiment in the following description with reference to the drawings, in which like numbers represent the same or similar elements, as follows:

FIG. 4 shows an exemplary Table of All Windows, in accordance with a preferred embodiment.

FIG. 5 shows an exemplary screen display resulting from the Table of All Windows, in accordance with a preferred embodiment.

FIG. 6 shows an exemplary screen display of an individual window option screen, called "Create Screensaver Breakthrough Settings", in accordance with a preferred embodiment.

DETAILED DESCRIPTION OF PREFERRED EMBODIMENTS

Figure 1:
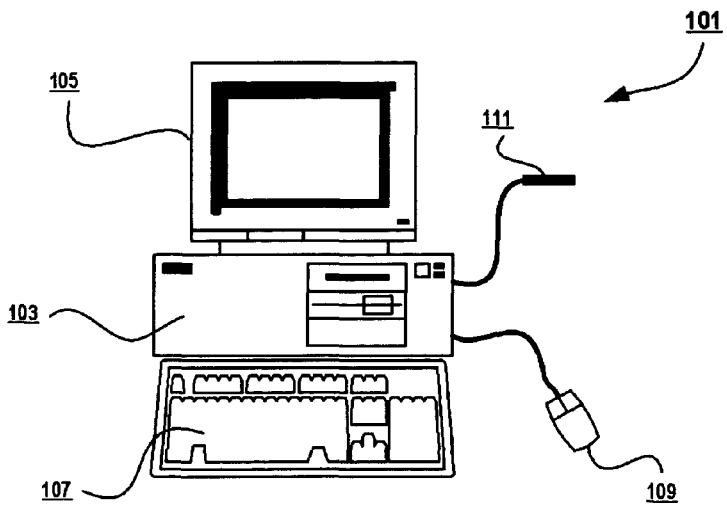
FIG. 1 is a block diagram of a general-purpose computer system to which the present invention may be applied.

With reference now to the figures, and in particular with reference to FIG. 1, a computer system 101 includes a processor unit 103, which is typically arranged for housing a processor circuit along with other component devices and subsystems of the computer system 101. The computer system 101 also includes a monitor unit 105 (which may be a CRT, a liquid crystal display, flat panel or other display device), a keyboard 107 and a mouse or pointing device 109, which are all interconnected with the computer system illustrated. Also shown is a connector 111, which is arranged for connecting a modem or network card within the computer system to a communication line such as a telephone line, cable or other communication medium. The connector 111 may also be implemented in a cellular or other wireless network.

Figure 2:
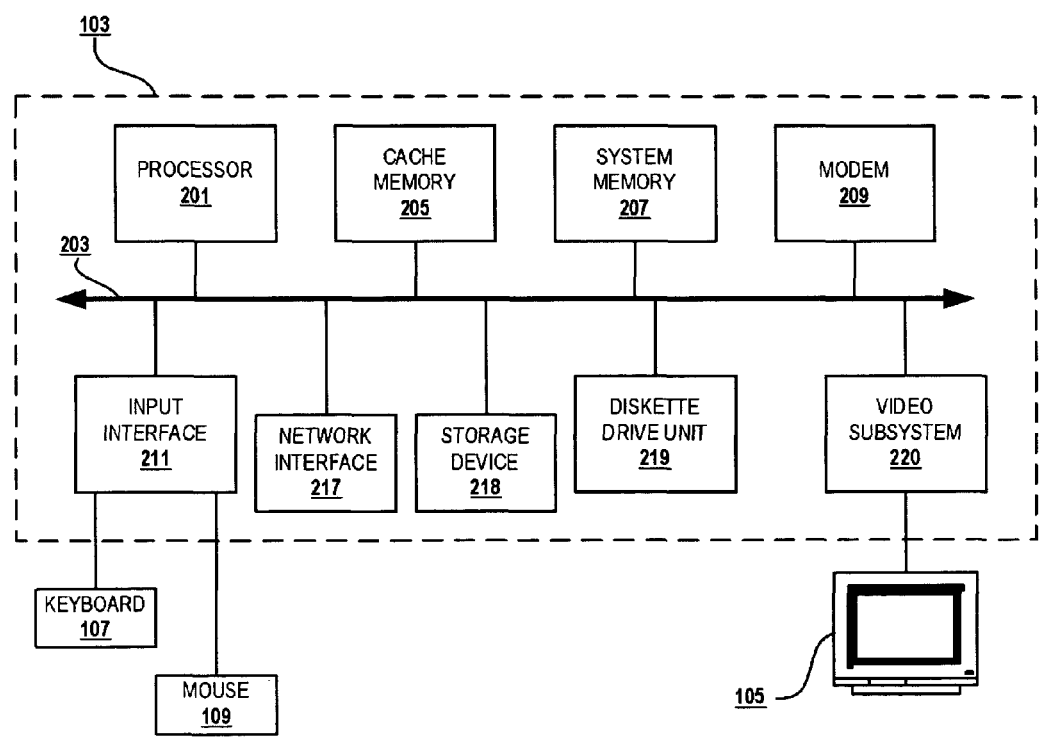
FIG. 2 is a block diagram of major components of the general-purpose computer system shown in FIG. 1.

Several of the major components of the system 101 are illustrated in the block diagram of FIG. 2. A processor circuit 201 is connected to a system bus 203, which may be any host system bus. It is noted that the processing methodology disclosed herein will apply to many different bus and/or network configurations. A cache memory device 205 and a system memory unit 207 are also connected to the bus 203. A modem 209 is arranged for connection to a communication line, such as a telephone line, through a connector 111 (FIG. 1). The modem 209, in the present example, selectively enables the computer system 101 to establish a communication link and initiate communication with another computer system, or network or database server. Modem 209 may be an analog, Digital Subscriber Line or cable modem, for example.

The system bus 203 is also connected through an input interface circuit 211 to a keyboard 213 and a mouse or pointing device 215. The bus 203 is also coupled to a network interface subsystem 217 and a diskette drive unit 219. A video subsystem 220, which may include a graphics subsystem, is connected to a display device 221. A storage device 218, which may comprise a hard drive unit and/or an optical CD, is also coupled to the bus 203. The diskette drive unit provides a means by which individual diskette programs may be loaded on to the hard drive, or accessed directly, for selective execution by the computer system 101. As is well known, program diskettes containing application programs represented by magnetic indicia on the diskette, may be read from the diskette drive, and the computer system is selectively operable to read such magnetic indicia and create program signals. Such program signals are selectively effective to cause the computer system to present displays on the screen of a display device and respond to user inputs in accordance with the functional flow of the application program on the diskette.

In general, an implementing computer system may include a plurality of processors in a multi-bus system in a network of similar systems. However, since the workstation or computer system implementing the present invention in an exemplary embodiment is generally known in the art and composed of electronic components and circuits generally known to those skilled in the art, the computer system details beyond those shown in FIGS. 1 and 2 are not specified to any greater extent than that considered necessary as illustrated for the understanding and appreciation of the underlying concepts of the present invention and in order not to obfuscate or distract from the teachings of the present invention.

Figure 3:
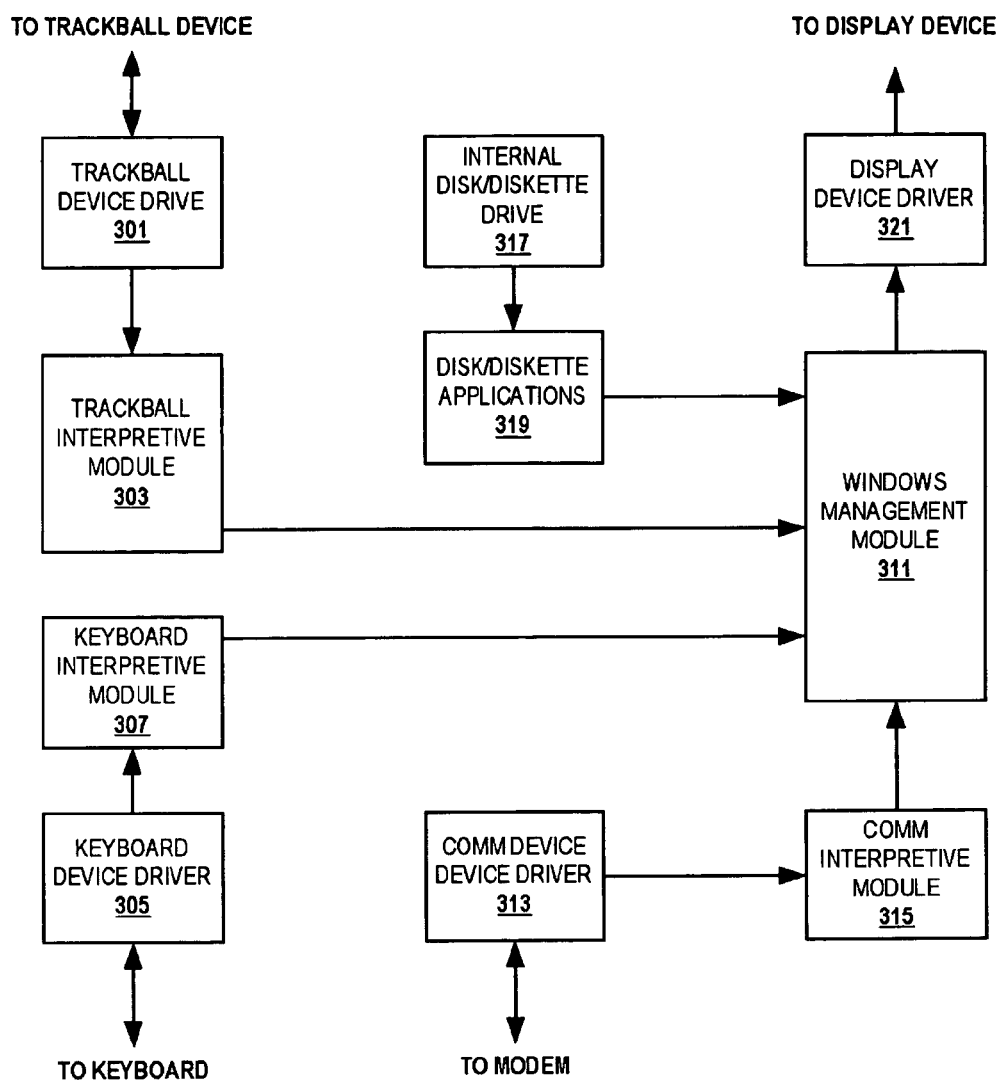
FIG. 3 is a functional block diagram of the user interface system implemented as a part of or in conjunction with the software operating environment within the exemplary system.

In FIG. 3, there is shown a functional block diagram of the user interface system implemented as a part of or in conjunction with the software operating environment within the exemplary system 101. As will be appreciated, while a software embodiment is disclosed, those skilled in the art will recognize that the functionality implemented by the user interface system can also be implemented through an entirely hardware environment of electronic components and circuits, or through a combination hardware and software environment including components from both. In this exemplary software operating environment, one or more applications and software modules comprising the user interface system interact with various modules and components of what is known in the art as an operating system. In addition, the various modules and components of the operating system interface with each other. Finally, the modules and components interface with hardware present on the computer system through what is known in the art as a device driver module and/or through an Original Equipment Manufacturer (OEM) adaptation layer. The specific device drivers, modules and applications identified in FIG. 3 control user interface devices in computer system 101. They are loaded into system/cache memory 205/207, executed by processor 201 and managed by the computer's operating system (not shown).

As illustrated in FIG. 3, the user interface software system includes a windows management module 311 for implementing the screensaver breakthrough function as provided in an exemplary embodiment of the present invention. The user interface software system further includes a trackball device driver 301 coupled between a mouse trackball device (not shown) and a trackball interpretive module 303. The trackball device may be a movable mouse riding on a trackball or a stationary base unit for a trackball mounted on the base. The output of the trackball interpretive module 303 provides trackball input signals to the windows management module (WMM) 311. The trackball input signals are representative of user inputs from the mouse/pointing device 109. The keyboard 107 is coupled through a keyboard device driver 305 and a keyboard interpretive module 307 to furnish inputs to WMM 311. A communication (COMM) device driver 313 couples the modem 209 to a COMM interpretive module 315 which, in turn, provides inputs to WMM 311. An internal disk or diskette drive 317 is operable to run disk and diskette applications 319 and provide application input to WMM 311.

WMM 311 is a process that runs on top of the operating system. In Linux, this is the X-windowing system. Applications make calls to the Window Manager's Application Programming Interface (API), which allow for the input/output of data to the screen. In order to accommodate the large number of different application needs, operating systems typically provide such APIs to provide processes access to a wide variety of functionality that is common to many different applications. Any one application generally uses only a small subset of the available APIs. Providing a wide variety of APIs frees application developers from having to write code that would have to be potentially duplicated in each application.

WMM 311 coordinates the screen data flow from the various devices and applications into an orderly presentation of windowed information on the display device 221. WMM 311 generates display graphics to a flat panel or other display device by providing input signals to a display device driver 321 connected to the display device 221 in the exemplary illustration. WMM 311 has many internal subroutines to accomplish its overall function. As part of integrating keyboard, mouse, application and modem (e.g. Internet) input, WMM 311 must serve as the window manager for the system and handle window creation, window movement, window iconization, window resizing, window z-ordering and "bring-window-into-focus" (i.e., make it active), amongst many other functions. In order to manage these windows efficiently, it is necessary for WMM 311 to maintain a database, called a "Table of All Windows," identifying all windows displayed or "inconified" for a particular session.

Screensaver functionality can be generated by the operating system, an application or WMM 311 directly. When a "screensaver" function is invoked, WMM 311 prevents any processes from displaying data on the display. Additionally, some of the devices that interface with WMM 311 are masked off, while other devices may continue to function and update window images sent to WMM 311 even though the screen is "locked" by the screensaver function and will not update or change the display in response to the updates while the screensaver is running.

In any modem operating system (Linux, UNIX, Windows), multiple user identifiers are used for the separation of privileges. In UNIX/Linux, the most powerful user is the "root" user, or the "administrator" in Windows. The most critical processes requiring elevated privileges execute as the "root" user. In the case where certain software executing in the system has an urgent message for the user, the system's window manager allows the application to "pop-up" a window to the top of the user's z-ordered window scheme to be displayed at the top of the stacked windows in the display. In accordance with the preferred embodiment of the present invention, certain specified applications are permitted to display a notification window at the top of the z-ordering, even above the display created by a screensaver executing in the display.

As shown in FIG. 4, a table 400 is an exemplary Table of All Windows for the computer, and contains information about the contents of each window present in the display, including information regarding the nickname, z-order and the X-Y limits of the pixels of each window as it exists in the display. Each entry for a window also contains an identifier or "nickname" for the window, which is usually the same or similar to the identifier or "nickname" commonly seen in the activate button or "pull-down bar" for a window. The user also can cause the X-Y coordinates of each window within the display to change by moving or resizing windows about the screen. Software functions that create or modify the content of each window (such as applications executing in the computer system) create or modify the display values of the actual pixels identified in the table 400. In order to correctly perform this function, these software functions must always first obtain the X-Y coordinate data from table 400. From these X-Y coordinates, the height and width of the window can be derived. Although an actual table is far more complex, for this example, the screen is depicted as a 100×100 matrix. The last column of each entry for a window is the disk location of the last saved copy of the window.

The table entries in FIG. 4 would result in the exemplary screen display shown in FIG. 5. As the highest level z-order (i.e. "1" in the exemplary table 400), the "Fax Viewer" window 509 is displayed on top of all other windows. The order of display for the other windows is also determined by their z-order, except for Iconified applications (for example, the email application is currently Iconified) and is shown as an Icon (not shown) instead of as a separate Window in the display. The user can change the Bordering and the X-Y coordinates of any entry by taking actions like mouse clicking or window "drag" and "resize" functions. Table 400 always contains one default entry that describes the background layer for the entire screen display and is always locked at the bottom of the Bordering by WMM 311. All active windows are displayed above the background in the user's display, even when the background is brought into focus (i.e., active) by the user clicking on the background.

Once a screensaver is activated in the display, the currently displayed windows are replaced by a static or dynamic image, animation, or in some cases a blank (black) screen. An event in the system will trigger WMM 311 to suspend the screensaver and to re-display the current screen. This event is usually some type of input by the user such as moving the mouse or hitting a key on the keyboard. In a preferred embodiment, these events are sensed by trackball interpretive module 303 and keyboard interpretive module 307 and are communicated to WMM 311, which then cancels the screensaver display being generated by display device driver 321 and reinstitutes the current screen as dictated by the table 400. In accordance with a preferred embodiment of the present invention, another type of event communicated to WMM 311 is an interrupt driven from an application or process executing within the computer system. If an application interrupt is received by WMM 311 while the screensaver is activated, WMM 311 first determines if a screensaver breakthrough is permitted for the particular application interrupt under the currently configured screensaver breakthrough policies, and, if so, WMM 311 proceeds to notify the user of the event by displaying a specified alert notification window on top of the screensaver in the z-ordering without suspending the screensaver display behind the alert window. In other words, the screensaver continues to be displayed and operate normally on the monitor to block the current screen display, but the priority message is displayed over the screensaver.

With reference now to FIG. 6, there is shown an individual window option screen provided to the user, called "Create Screensaver Breakthrough Settings," in accordance with a preferred embodiment of the present invention. This option screen allows the user to select the configuration parameters for certain specified windows when a specified alert event occurs while the screensaver is engaged. Settings for specific applications or processes are identified by a nickname. When initially selected, the "Create Screensaver Breakthrough Settings" option menu automatically populates nickname entries for each process or application currently executing in the data processing system. The user indicates those applications that are permitted to "punch" or pop through the screensaver as a "Breakthrough Application." For each breakthrough application, the user identifies the type of alerts that are permitted to breakthrough, and for each such alert, the user can specify a "Notification Window Style," which identifies how such an alert or event is displayed to the user at a layer above the screensaver in the display.

Other options could also be specified by the user in the screensaver breakthrough settings to more particularly control alerts and events allowed or denied to breakthrough the screensaver with a priority message. For example, the "Create Screensaver Breakthrough Settings" might explicitly allow or deny entry of particular applications or applications running under particular users or groups. Further, the settings could specify breakthrough authorization of alerts above a predefined security level, without regard for which application generated the alert. Moreover, a notification window's style or behavior of the notification window could also be configured. For example, the notification window might periodically move around the screen or have some other dynamic feature for noticeability. The settings might also include a security feature that generates a special alert to break through the screensaver to notify the user that an alert was pending but without disclosing the content of the alert. In this embodiment, the alert might require the user to input a password or provide some other mechanism to authenticate the user as being authorized to receive the alert before the actual alert is displayed above the screensaver. These various alternative embodiments would be included as additional settings within the "Create Screensaver Breakthrough Settings" screen, however not all such settings are shown in the figures.

Figures 7, 8:
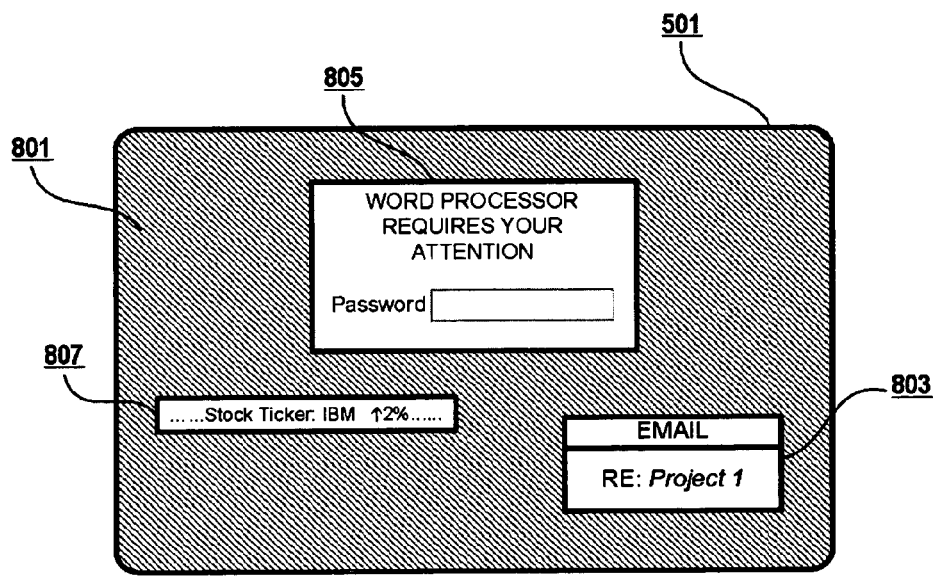
FIG. 7 shows an exemplary table of windows display security settings, in accordance with a preferred embodiment.
FIG. 8 shows an exemplary screen shot of a display implementing the security function for an inactive window, in accordance with a preferred embodiment of the present invention.

After being set in the screen of FIG. 6, the user options are saved as screensaver breakthrough settings in table 700, as seen in FIG. 7. Table 700 need only be created once by the user, but may be updated whenever the user sees fit. When creating table 700 from the setting screen in FIG. 6, the user may also specify application "nicknames" in column 702 for applications not currently being displayed on the screen or executing in the system. Later activation of those applications within the operating system will load the application's window data into table 400 and activate screensaver breakthrough processing of the application's alerts in accordance with the settings for the application in table 700.

The operation of WMM 311 is now described in conjunction with FIGS. 7 and 8, in accordance with a preferred embodiment of the present invention. After a period of inactivity or upon user activation, WMM 311 overrides the display of the current screen on the computer system and activates its screensaver functionality. Depending upon user settings, the screensaver blanks the screen or displays some other type of static or dynamic image on the screen in place of the windows and other graphical user interfaces being displayed on the screen. Following activation of the screensaver, WMM 311 continuously monitors the executing processes in the system for generated alerts or notifications. On receipt of such a notification, WMM 311 accesses table 700 at the entry 702 matching the nickname of the application or process issuing the notification. If the application is designated as a breakthrough application (704), WMM 311 compares the received notification event with the specified priority alerts 706 in table 700. If the notification event matches a priority alert therein, such alert is permitted to punch through the screensaver. The notification window style 708 specifies the format and type of notification window displayed on top of the screensaver. WMM 311 interpolates the information presented by the received notification and generates a notification window therefrom, in accordance with the notification window style 708. WMM 311 then instructs displayed device driver 321 to display the generated notification window in a z-order on top of the screensaver display. This notification window is then displayed to the user on top of the screensaver, which continues to be displayed uninterrupted.

FIG. 8 shows an exemplary screenshot of display 501 implementing the screensaver breakthrough for prioritized messages functionality, in accordance with a preferred embodiment of the present invention. As seen in the example of FIG. 8, a screensaver 801 has been activated within the display 501 to block display of windows 503-509 and background 511. In this case, the windows and background 503-511 have been replaced by the display of a cross-hatched pattern screensaver 801. In the example of FIG. 7, three applications with the nicknames 702 "email client", "word processor" and "web browser" are specified as being allowed to break through the screensaver (704), as seen in table 700. The priority alerts from these applications permitted to break through are specified at column 706, and include a "new mail note" from the email client, a "save query" inquiring whether the user wants to save a document currently displayed in the word processor, and stock alerts issued by the web browser.

As seen in FIG. 8, a notification window 803 has broken through the screensaver. In accordance with the notification windows style 708, this email notification only displays the subject line of the email and not the entire email. Notification window 805 is a password protected dialog box issued by the word processor. In this example, a "save query" alert 706 generated the notification, but the notification window style 708 specifies a "Secure Dialog Box" style. Accordingly, the content of the notification issued by the word processor is not disclosed, and instead, WMM 311 generates the window 805 indicating to the user that the word processor requires the user's attention. Additionally, this notification window style also requires the user to enter a password in order to retrieve the actual content of the notification event from the word processor. Last, a notification window 807 has been generated in response to a stock alert from the web browser. In this example, WMM 311 generates a text message within the window conveying the stock alert generated by the web browser, in accordance with notification window style 708.

In an alternative preferred embodiment of the present invention, an application 319 FIG. 3) implements the screensaver breakthrough for prioritized messages functionality, in accordance with a preferred embodiment of the present invention. An application such as an email client takes advantage of this feature through a window manager API to request that particular messages specified by the application 319 supersede the screensaver in the z-ordering of the display generated by WMM 311. Within the application, an option setting table similar to table 700 would specify priority alerts 706 that are permitted to punch through the screensaver upon activation. Further, such a table would include the notification window style 708 to be used for the punch through window for such an alert.

Figure 9:
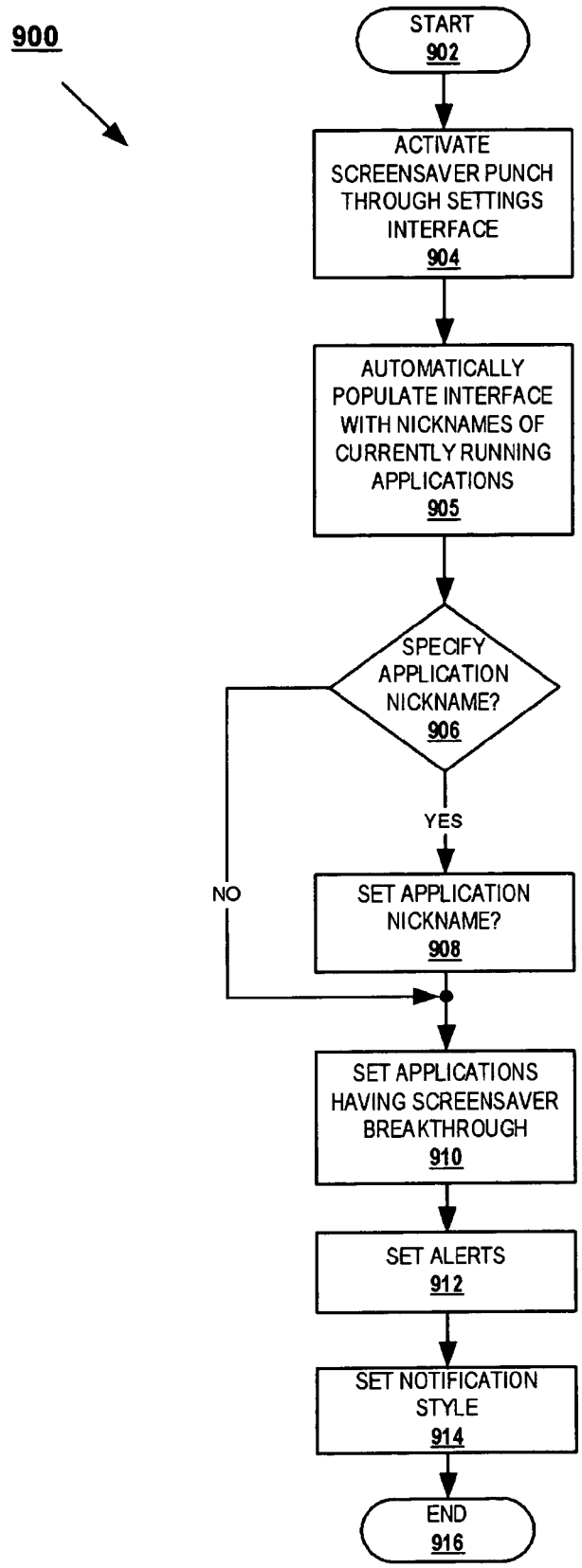
FIG. 9 shows a flow diagram of an exemplary process used to initiate and set up the display security features of a preferred embodiment of the present invention.

With reference now to FIG. 9, there shown a flow diagram for an exemplary process used to initiate and set-up the screensaver breakthrough functionality of a preferred embodiment of the present invention. Process 900 starts at step 902 and proceeds to activate the screensaver breakthrough settings interface at step 904. At step 905, WMM 311 automatically populates the interface (FIG. 6) with nicknames of all applications currently running in the computer system. Thereafter, process 900 queries the user to determine if an application nickname will be entered at decision block 906. If so, the user desires to set screensaver breakthrough settings for additional nickname(s) of applications that may execute in the future, and enters the application nickname into the interface as shown in step 908. Following either step 906 or 908, the user specifies applications having screensaver breakthrough functionality within the screensaver breakthrough setting interface at step 910. Thereafter at step 912, the user specifies within the screensaver breakthrough setting interface the alerts permitted to breakthrough a screensaver. At step 914, the user identifies a notification styles in the settings interface. Thereafter, process 900 ends at step 916.

Figure 10:
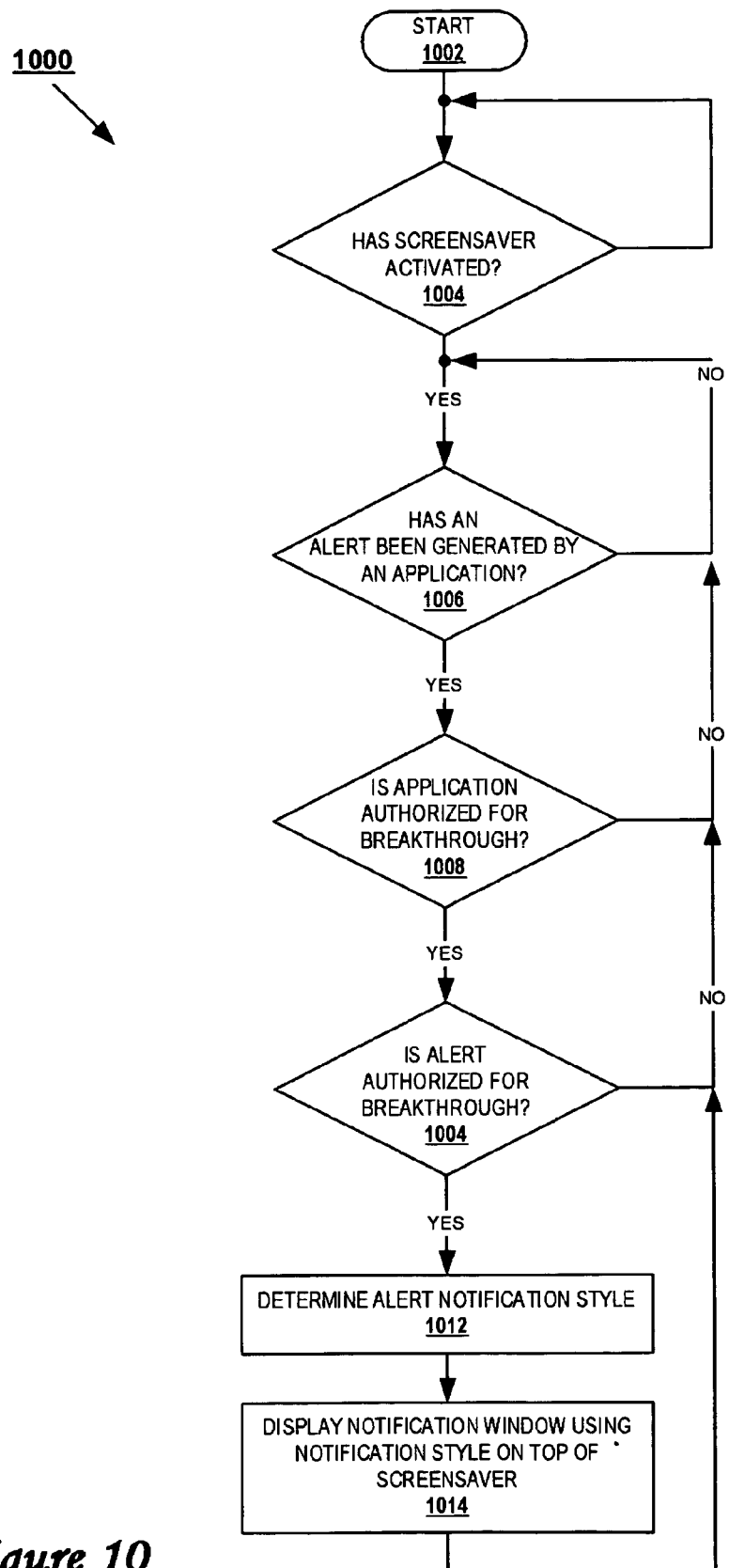
FIG. 10 shows a flow diagram of a process for providing screensaver breakthrough of prioritized messages, in accordance with the preferred embodiment of the present invention.

FIG. 10 shows a flow diagram of a process for providing screensaver breakthrough of prioritized messages, in accordance with the preferred embodiment of the present invention. Process 1000 starts at 1002 and proceeds to step 1004 where process 1000 remains idle until activation of the system's screensaver. Upon activation of the screensaver, process 1000 proceeds to step 1006 where WMM 311 continuously monitors for a display alert being generated and sent by an application executing in the computer system. Upon receipt of such an alert, WMM 311 determines, at step 1008, if the application issuing the alert is authorized to breakthrough the screensaver with prioritized messages. If not, the process returns to step 1006 to await another alert, and the screensaver continues to be displayed without interruption by the received alert. If the application is authorized for breakthrough, as determined at step 1008, for example as specified in column 704 of table 700, the process proceeds to step 1010 where WMM 311 determines if the particular alert received from the application is a type that is authorized for breakthrough by accessing table 700 to compare the received alert to the alerts listed at column 706 for the authorized application 702. If the received alert is not one of the listed alerts, the process returns to step 1006 to await an additional alert. If the alert is listed in column 706, the process proceeds to step 1012 where WMM 311 determine the alert notification style listed in column 708 of table 700 for the received alert 706. Upon determination of the alert style 708, the process proceeds to step 1014, where WMM 311 generates instructions for the display driver to display a notification window using the determined notification style on top of the screensaver and containing the prioritized message delivered by the received alert. If the notification style is of a secure type, the notification style may cause WMM 311 to display a notification window merely alerted the user to the fact that a prioritized message is requesting attention without communicating specific information regarding the content or type of alert issued by the generating application.

While the invention has been particularly shown and described with reference to a preferred embodiment, it will be understood by those skilled in the art that various changes in form and detail may be made therein without departing from the spirit and scope of the invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention. While this invention is described in terms of the best mode for achieving this invention's objectives, it will be appreciated by those skilled in the art that variations may be accomplished in view of these teachings without deviating from the spirit or scope of the present invention.

What is claimed is:

1. A method for providing alert notification in a data processing system, said method comprising:

in response to the receipt of a request to display an alert on a display device of said data processing system while a screensaver presentation is already being displayed on said display device of said data processing system, wherein said request is originated from a process via a window management module (WMM) that interpolates said request to ascertain a notification window style and an alert type, determining whether or not said process is authorized to display said alert over said screensaver presentation;

in response to a determination that said process is authorized to display said alert over said screensaver presentation, displaying according to said notification window style and said alert type a notification window indicating said alert over said screensaver presentation in said display device, wherein said screensaver presentation continues to be displayed in at least a portion of said display device during display of said alert; and in response to a determination that said process is not authorized to display said alert over said screensaver presentation, displaying said screensaver presentation without displaying a notification window indicating said alert over said screensaver presentation.

2. The method according to claim 1, wherein said notification window indicates the presence of said alert without indicating the content or type of alert.

3. The method according to claim 1, wherein said notification window requires user authentication before the content or type of alert is displayed.

4. The method according to claim 1, wherein said notification window indicates the content or type of alert.

5. The method according to claim 1, wherein said notification window indicates only a portion of the content of the alert.

6. The method according to claim 1, further comprising determining if whether or not said alert is a type authorized to display over said screensaver presentation, and displaying said notification window when said alert is an authorized type.

7. The method according to claim 1, wherein said process is authorized to display over said screensaver presentation according to a user-customizable preference.

8. A data processing system comprising:

means for, in response to the receipt of a request to display an alert on a display device of said data processing system while a screensaver presentation is already being displayed on said display device of said data processing system, wherein said request is originated from a process via a window management module (WMM) that interpolates said request to ascertain a notification window style and an alert type, determining whether or not said process is authorized to display said alert over said screensaver presentation;

means for, in response to a determination that said process is authorized to display said alert over said screensaver presentation, displaying according to said notification window style and said alert type a notification window indicating said alert over said screensaver presentation in said display device, wherein said screensaver presentation continues to be displayed in at least a portion of said display device during display of said alert; and means for, in response to a determination that said process is not authorized to display said alert over said screensaver presentation, displaying said screensaver presentation without displaying a notification window indicating said alert over said screensaver presentation.

9. The data processing system according to claim 8, wherein said notification window indicates the presence of said alert without indicating the content or type of alert.

10. The data processing system according to claim 8, wherein said notification window requires user authentication before the content or type of alert is displayed.

11. The data processing system, according to claim 8, wherein said notification window indicates the content or type of alert.

12. The data processing system according to claim 8, wherein said notification window indicates only a portion of the content of the alert.

13. The data processing system according to claim 8, further comprising means for determining whether or not said alert is a type authorized to display over said screensaver presentation, and displaying if said notification window when said alert is an authorized type.

14. The data processing system according to claim 8, wherein said process is authorized to display over said screensaver presentation according to a user-customizable preference.

15. A machine-readable medium including program logic embedded therein for providing alert notification in a data processing system, said machine-readable medium comprising:

program code for, in response to the receipt of a request to display an alert on a display device of said data processing system while a screensaver presentation is already being displayed on said display device of said data processing system, wherein said request is originated from a process via a window management module (WMM) that interpolates said request to ascertain a notification window style and an alert type, determining whether or not said process is authorized to display said alert over said screensaver presentation;

program code for, in response to a determination that said process is authorized to display said alert over said screensaver presentation, displaying according to said notification window style and said alert type a notification window indicating said alert over said screensaver presentation in said display device, wherein said screensaver presentation continues to be displayed in at least a portion of said display device during display of said alert; and program code for, in response to a determination that said process is not authorized to display said alert over said screensaver presentation, displaying said screensaver presentation without displaying a notification window indicating said alert over said screensaver presentation.

16. The machine-readable medium according to claim 15, wherein said notification window indicates the presence of said alert without indicating the content or type of alert.

17. The machine-readable medium according to claim 15, wherein said notification window requires user authentication before the content or type of alert is displayed.

18. The machine-readable medium according to claim 15, wherein said notification window indicates the content or type of alert.

19. The machine-readable medium according to claim 15, wherein said notification window indicates only a portion of the content of the alert.

20. The machine-readable medium according to claim 15, further comprising program code for determining whether or not said alert is a type authorized to display over said screen-saver presentation, and displaying said notification window when said alert is an authorized type.

21. The machine-readable medium according to claim 15, wherein said process is authorized to display over said screen-saver presentation according to a user-customizable preference.

* * * * *